United States Patent [19]

Christ et al.

[11] Patent Number: 5,007,180
[45] Date of Patent: Apr. 16, 1991

[54] METHOD OF AND AN APPARATUS FOR THE SEPARATION OF CONDENSABLE HARMFUL SUBSTANCES

[75] Inventors: Michael Christ, Stuttgart; Wolfgang Teichmann, Filderstadt, both of Fed. Rep. of Germany

[73] Assignee: Sueddeutsche Kuehlerfabrik Julius Fr. Behr GmbH & Co. KG, Stuttgart, Fed. Rep. of Germany

[21] Appl. No.: 375,011
[22] PCT Filed: Sep. 7, 1988
[86] PCT No.: PCT/EP88/00807
 § 371 Date: Jun. 12, 1989
 § 102(e) Date: Jun. 12, 1989
[87] PCT Pub. No.: WO89/03499
 PCT Pub. Date: Apr. 20, 1989

[30] Foreign Application Priority Data

Oct. 10, 1987 [DE] Fed. Rep. of Germany ....... 3734388

[51] Int. Cl.$^5$ .............................................. F26B 3/00
[52] U.S. Cl. .......................................... 34/32; 34/73; 55/5
[58] Field of Search .................. 34/73, 74, 79, 85, 32, 34/82; 55/5, 9, 11, 135

[56] References Cited

U.S. PATENT DOCUMENTS

| 4,012,847 | 3/1977 | Rand ............................. 34/75 |
| 4,171,243 | 10/1979 | Brooks et al. ................. 159/48 |
| 4,715,965 | 12/1987 | Sigerson et al. ................ 210/800 |

FOREIGN PATENT DOCUMENTS

| 1290923 | 7/1969 | Fed. Rep. of Germany . |
| 2746927 | 4/1978 | Fed. Rep. of Germany . |
| 2750973 | 5/1979 | Fed. Rep. of Germany . |
| 3017778 | 11/1980 | Fed. Rep. of Germany . |
| 3009938 | 9/1981 | Fed. Rep. of Germany . |
| 3152372 | 9/1982 | Fed. Rep. of Germany . |
| 3410762 | 10/1985 | Fed. Rep. of Germany . |
| 3608978 | 10/1986 | Fed. Rep. of Germany . |
| 3703706 | 8/1987 | Fed. Rep. of Germany . |
| 3614450 | 11/1987 | Fed. Rep. of Germany . |
| 3621150 | 1/1988 | Fed. Rep. of Germany . |
| 3614385 | 2/1988 | Fed. Rep. of Germany . |
| 522188 | 6/1972 | Switzerland . |

OTHER PUBLICATIONS

A. Schraud, *Melliand Textilberichte*, "Exhaust Air Decontamination for Drying and Heat Treatment Plants with Regard to Heat Recovery" Dec. 1976, pp. 1014–1019.

P. Richner, *Textilveredlung*, "Effects of Carriers on Water and Air as Well as Fundamental Solutions to the Problem of Decontamination of Textile Exhausted Air", No. 4, 1978, pp. 134–139.

*Primary Examiner*—Henry A. Bennet
*Attorney, Agent, or Firm*—Foley & Lardner

[57] ABSTRACT

In the case of a method of separating condensable harmful substances and solid particles from the process gas or used air from particularly a textile finishing plant such as for example a drier or a coating plant, for example in the paper or synthetic plastics industry, the used air is pre-filtered, cooled and passed through a mechanical final filtering apparatus. So that a considerable extent of separation from the used air is possible already at the pre-filtering stage, the warm used air is pre-filtered by being cooled to below the dewpoint of the condensable harmful substances and dispersed solid particles. The resultant condensate which contains impurities is extracted.

18 Claims, 2 Drawing Sheets

METHOD OF AND AN APPARATUS FOR THE SEPARATION OF CONDENSABLE HARMFUL SUBSTANCES

BACKGROUND OF THE INVENTION

The present invention relates to a method of and an apparatus for separating condensable harmful substances and solid particles from the process gas or used air particularly from a textile finishing plant such as for example a drier or a coating plant for example in the paper or synthetic plastics industry, wherein wasted air is pre-filtered, cooled and passed through a mechanical final filtering apparatus.

DESCRIPTION OF THE PRIOR ART

In a prior art method or a prior art apparatus, the used air from a plant is first fed to a mechanical pre-filter and then to the final filtering apparatus in the form of a glass fibre deep bed filter. If the used air which is to be cleansed is at a temperature of between 40° C. and 80° C. or is at more than 80° C., then between the pre-filter and the final filtering apparatus a single or two-stage cooling of the used air takes place via one or two heat exchanger stages. Only when the used air which is to be cleaned has cooled to about 40° C. prior to entering the final filtering apparatus is it fed to this latter in which only the impurities (condensable harmful substances and solid particles) which are present in aerosol form are separated off and extracted as a condensate. Therefore, the condensable harmful substances and the solid particles, particularly their dispersions, will be referred to hereinafter as aerosols.

This prior art method or this prior art apparatus does in particular have the disadvantage that the major part of the aerosol separation has to be undertaken by the mechanical final filtering apparatus which means that the glass fibre deep bed filter used for the purpose becomes very expensive and bulky, Not only the necessary size of the glass fibre deep bed filter but also the provision of the said mechanical pre-filter results in a considerable pressure loss in the flow of used air which has to be compensated for by correspondingly dimensioned ventilators. All these measures lead to considerable investment costs.

The problem on which the present invention is based is that of providing a method and an apparatus for the separation of condensable harmful substances and solid particles of the types mentioned at the outset, in which a considerable amount of separation from the used air is possible already at the pre-filtering stage.

SUMMARY OF THE INVENTION

In the case of a method for separating condensable harmful substances and solid particles of the types mentioned at the outset, this problem is resolved by pre-filtering of a warm waste air by cooling this air to below the dew point of the condensable harmful substances and dispersed solid particles, and extracting the resultant condensate containing impurities.

In the case of an apparatus for separating condensable harmful substances and solid particles of the types mentioned at the outset, this problem is resolved by an apparatus which comprises for pre-filtering the waste air at least one heat exchanger stage provided with a condensable extractor.

As a result of the measures according to the invention, already at the pre-filtering stage, separation of condensable harmful substances and solid particles or aerosols and thus an extraction of the condensate occurring is achieved by means of a cooling of the used air (to below the dewpoint of the aerosols). This can already represent an amount of up to 60% of the aerosols which have to be separated. This means that the mechanical final filtering apparatus can be substantially more compact and of smaller dimensions since it only has to accommodate or separate off a part of the quantity of aerosol which previously had to be eliminated from the used air. At the same time, this means that the pressure losses in the flow of used air are reduced and that the ventilators can be of smaller dimensions. All these factors result in investment economy. At the same time, even air which is at more than 100° C. is cooled.

Expediently, according to, two heat exchanger stages are provided of which one uses cooling air while the other uses either cooling air or, in order to achieve a higher heat exchange efficiency, cooling water. As a further development, in order to reduce the consumption of external energy, the warm cooling air or warm cooling water is used as a heat recovery carrier or waste heat utilisation carrier.

A preferred compact structural development of an apparatus is provided by disposing the two heat exchanger stages at a distance from each other connected to each other by a pipeline, and wherein said final filtering apparatus is located adjacent the second heat exchanger stage and includes a condensate extractor. For simplification when extracting the condensate individual condensate extractors connected to one another and led to a common condensate collector are expediently provided.

A preferred disposition of blower means for the used air is another object of the invention. In order to be able to control the proportion of used air which is applied to the heat exchanger stages or final filtering apparatus, at least one of the heat exchanger stages and/or the final filtering apparatus includes a short-circuit line in which there are valves or ventilation flaps. For the temporary separation of the heat exchanger stages or of the final filtering apparatus from the used gas line, for example for the purpose of cleaning, repair or the like, to provide valves or air flaps in the air line from the heat exchanger stages and the final filtering apparatus.

BRIEF DESCRIPTION OF THE DRAWINGS

Further details of the invention can be ascertained from the ensuing description in which the invention is described in greater detail and is explained with reference to the examples of embodiment shown in the accompanying drawings, in which.

DETAILED DESCRIPTION OF THE PREFERRED EMBODIMENT

Figure 1:
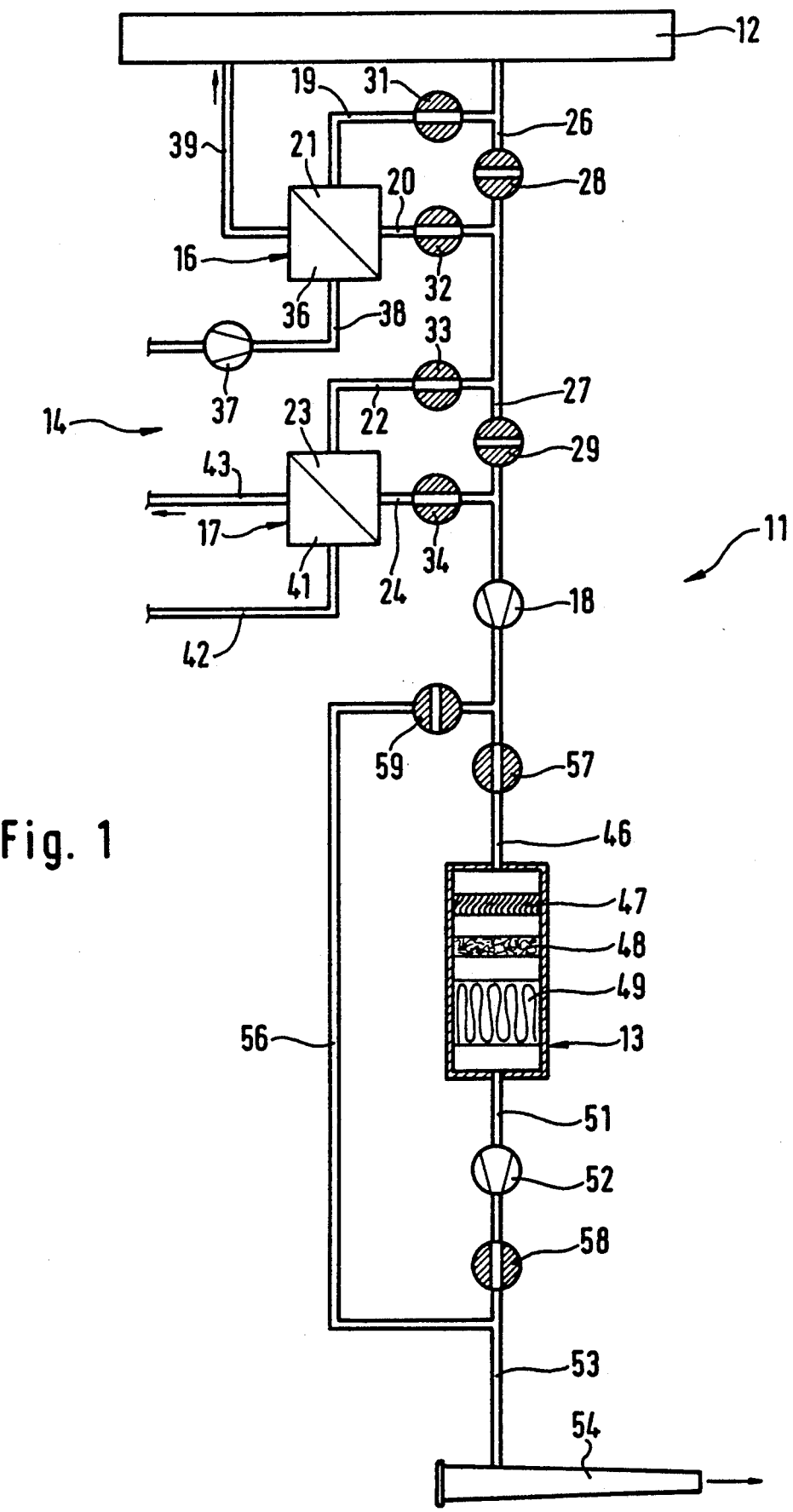

The apparatus 11 shown in FIG. 1 and adapted to separate condensable harmful substances and solid particles or their dispersions, here referred to as aerosols, from the used air from a drier 12 of a textile finishing plant is composed not only of a mechanical final filter 13 after which the aerosols are to a very great extent eliminated from the used air, but also for pre-filtering or pre-separating of aerosols, a heat exchanger apparatus 14 which in the case of the example of embodiment shown consists of a first stage in the form of an air/air heat exchanger 16 and a second stage in the form of an air/water heat exchanger 17.

The used air or a part of the consumed process air from the drier 12 is, by means of a blower 18 disposed between the heat exchanger apparatus 14 and the mechanical end filter 13, extracted or passed through a pipeline 19, 20, through the used air part 21 of the air-/air heat exchanger 16 and through a further pipe 22, 24 through the used air part 23 of the air/water heat exchanger 17.

The relevant used air part 21 and 23 of the heat exchangers 16, 17 is bridged by a short-circuit line 26 or 27, valves or air flaps 28, 29 and 31 to 34 being in each case provided in this as well as in the pipelines 19, 20, 22 and 24.

Room air or fresh air is passed via a blower 37 to the cooling part 36 of the air/air heat exchanger 16, the heated cooling air on the outlet side of the heat exchanger 16 being returned through a pipe 39 to the drier 12 for heat recovery. This heated cooling air can be used either directly as process gas or air in the drier 12 or for heating the process gas or that part of the process gas which has to be renewed in the drier 12, via a heat exchanger.

Fresh water is passed to the cooling part 41 of the air/water heat exchanger 17 through a pipeline 42, the heated cooling water being drawn off through a pipeline 43 and fed to an extraneous system such as for example a hot water heating system, a domestic water system or the like directly or through a heat exchanger, so that the waste heat can be utilized. It will be understood that the heat exchanger 17 may also be constructed as an air/air heat exchanger.

With this heat exchanger apparatus 14 as a pre-filtering or pre-separating arrangement, the following is achieved:

The used air from the drier 12 in the pipe 19 is at a temperature of about 170° C., harmful substances being present in the form of aerosols, in the amount of for instance about 173 mg/Nm$^3$. In the air/air heat exchanger 16, the used air is cooler to about 100° C. (to below the dewpoint of certain aerosols), so that by reason of the resultant condensation and binding of the harmful substances to the resultant condensate, a considerable part of these harmful substances can be separated off the extraction of the condensate, not shown here. If, for example, fresh air in the form of room air at a temperature of 28° C. is supplied for cooling purposes, then following the heat exchanger stage 16, the temperature of the cooling air in the pipe 39 will rise to about 127° C.

The used air already cleansed of aerosols to a certain degree is then fed to the air/water heat exchanger 17 at the outlet from which the used air in the pipe 24 is at a temperature of 65° C. Due to cooling of the used air to below the dewpoint of further aerosols, condensation takes place in this heat exchanger stage 17, also, so that together with the condensate, another considerable proportion of harmful substances or aerosols can be extracted in a manner not shown. At the end of this heat exchanger apparatus 14 there is in the used air a proportion of harmful substances or aerosols which has been reduced by 60%, so that the residual content is for example only around 56 mg/Nm$^3$. If cooling water at a temperature of for example 12° C. is now added to the air/water heat exchanger 17, then under the conditions mentioned, the cooling water is heated to a temperature of for example about 55° C. and is discharged through the pipe 43.

Of the remaining 40% of harmful substances or aerosols in the used air, a major part is separated off in the mechanical final filter 13 to which the used air is passed through a pipe 46. The mechanical final filter 13 comprises a three-stage filtering or separation stage for which in the first stage profile plates 47 are provided while in the second stage metal fibres 48 are provided, the third stage comprising filter mats 49. On the outlet side, the used air which may still for instance be at a temperature of around 50° C., is drawn from the filter 13 through a pipe 51 and a further blower 52 in order to compensate for the pressure drop in the final filter 13 and is blown out through a pipe 53 and a flue 54. Also the mechanical end filter 13 is bridged by a short-circuit line 56, valves or air flaps 57, 58 or 59 being provided in the pipes 51 and 53 and in the short-circuit line 56.

Figure 2:
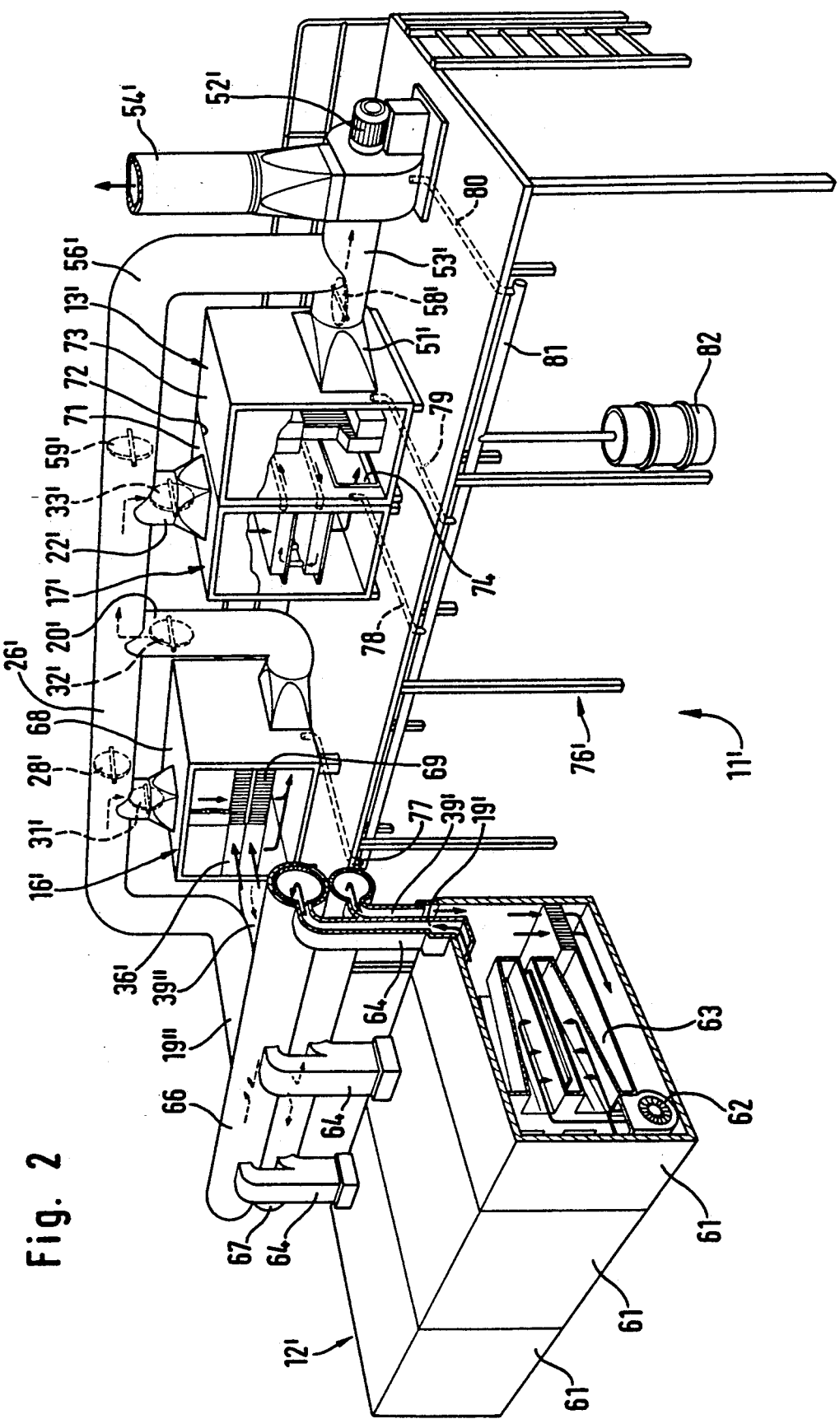
FIG. 1 is a diagrammatic view of an apparatus for separating aerosols from the used air from a drier in a textile finishing plant and FIG. 2 is a perspective view of a structural embodiment or alternative to the apparatus in FIG. 1.

FIG. 2 shows an alternative embodiment of apparatus 11' corresponding to the apparatus 11 shown diagrammatically in FIG. 1. The drier 12' which comprises a plurality of compartments 61 is supplied with circulated and partially renewed process air via a blower 62, the process air having been heated in a heat exchanger 63 by the cooling air which has been heated and which is supplied via the pipes 39'. Each of the compartments 61 of the drier 12' is provided with a twin tube 64 which receives the used air pipe 19' and the pipe 39' for the heated cooling air. The pipes 19' and 39' of the twin pipes 64 discharge in each case into a collecting pipe 66, 67 disposed parallel with and above each other, of which the collecting pipe 66 for the used air is connected to the pipe 19" to the air/air heat exchanger 16' while the collecting pipe 67 is connected to the pipe 39" from the cooling part 36' of the air/air heat exchanger 16'.

The air/air heat exchanger 16' comprises an insulated housing 68 in which there are easily removable cross-flow plate heat exchanger elements 69. Fluff filters readily accessible through doors are disposed upstream of the heat exchanger elements 69. In a manner not shown, the blower for supplying the fresh air is provided on one side of the housing 68. On the inlet side of the heat exchanger 16', the pipe 19" is provided with an air flap 31' while the outlet pipe 20' is provided with an air flap 32'. Here, too, the two pipes 19' and 20' are connected by a short-circuit pipe 26' in which there is an air flap 28'.

The air/water heat exchanger 17' is connected by the pipe 22' in which there is an air flap 33'. The construction of this heat exchanger 17' corresponds substantially to that of the first heat exchanger stage 16'. Greater condensation is made possible by the higher output of the air/water heat exchanger 17'. Immediately adjacent a side wall 72 of the housing 71 of the second heat exchanger stage 17' is the housing 73 of the mechanical final filter 13', a passage 74 being provided for the used air. The construction of the mechanical final filter 13' can correspond to that of the final filter 13 in FIG. 1 or it may be divided into two and take the form of one part which is equipped with filter mats and one which is in the form of a drip separator.

The outlet pipe 51' which is provided with a ventilation flap 58' is connected on the one hand by a short-circuit line 56' which contains a ventilation flap 59' to the feed pipe 22' to the heat exchanger 17' and on the other hand it leads via a pipe 53' and a blower 52' to a flue 54'.

In the example of embodiment shown, the heat exchanger apparatus 14' or the two heat exchangers 16', 17' and the final filter 13' are raised up on a frame 76 under the extraction pipes 77, 78, 79, 80 from the heat exchangers 16', 17', the final filter 13' and the flue 54' extending at the bottom to a collective extraction pipe 81 which is connected to a condensate collector 82.

The method of separating harmful substances or aerosols is in the case of the apparatus 11' shown in FIG. 2 in principle the same as in the case of the apparatus 11 in FIG. 1 but the used air which is at a temperature of for instance 170° C. is indeed likewise cooled to 100° C. in the first stage but in the second heat exchanger stage 17' it can be cooled down to about 40° C. Also in consequence the used air is sufficiently cooled upstream of the mechanical final filter 13' that the majority of harmful substances are present only as ultra-fine droplets and can be separated mechanically.

The present invention can be used not only in the case of textile finishing plants but also in coating plants, for example in the paper and synthetic plastics industries.

We claim:

1. A method of separating condensable harmful substances and solid particles from a process gas or waste air,
   comprising the steps of:
   pre-filtering a warm waste air in a first heat-exchanger stage by cooling this air with a first cooling medium to below the dew point of first condensable harmful substances and dispersed solid particles to produce a first condensate containing impurities, discharging the first cooling medium for heat recovery and heating the process gas, and extracting the first condensate containing impurities;
   pre-filtering said warm waste air in a following second heat-exchanger stage by cooling this air with a second cooling medium to below the dewpoint of second condensable harmful substances to produce a second condensate containing impurities, and extracting the second condensate containing impurities; and
   mechanically final filtering the waste air in a third stage after it has been cleansed twice in said first and said second stage.

2. A method according to claim 1, wherein the waste air is at a temperature above 100° C., and further comprising the step of cooling this air prior to pre-filtering.

3. A method according to claim 1, wherein said pre-filtering step in said second heat exchanger stage further comprises the step of discharging the second cooling medium in the second heat exchange stage on the outlet side for waste heat utilization in an extraneous system.

4. An apparatus for separating condensable harmful substances and solid particles from a process gas or waste air, comprising:
   an apparatus for pre-filtering waste air, including first and second heat exchanger stages connected in tandem, each of which has a separate condensate extractor and of which the first stage comprises a waste air/air heat exchanger while the second stage comprises a heat exchanger selected from the group consisting of a waste air/water and a waste air/air heat exchanger; and
   a mechanical final filtering apparatus connected subsequent to said heat exchanger stages.

5. An apparatus according to claim 4, wherein a cooling air outlet from said first heat-exchanger stage is connected to a process air inlet of a plant to which said apparatus is connected.

6. An apparatus according to claim 4, wherein a cooling air outlet from said first heat-exchanger stage is connected to a heat exchanger in a plant to which said apparatus is connected through which said process air passes.

7. An apparatus according to claim 4, further comprising in that a first blower provided in a air line downstream of the final filtering apparatus.

8. An apparatus according to claim 4 further comprising a second blower provided in an air line downstream of heat exchanger stage and upstream of said final filtering apparatus.

9. An apparatus according to claim 4, wherein said two heat exchanger stages are disposed at a distance from each other and are connected to each other by a pipeline, and wherein said final filtering apparatus is located adjacent the second heat exchanger stage, wherein said mechanical final filtering apparatus includes a condensate extractor.

10. An apparatus according to claim 9, characterised in that the individual condensate extractors are connected to one another and lead to a common condensate collector.

11. An apparatus according to claim 4 wherein at least one of said heat exchanger stages and said final filtering apparatus includes a short-circuit line in which there are first valves or ventilation flaps.

12. An apparatus according to claim 11, further comprising second valves or air flaps provided in an air line from said heat exchanger stages and said final filtering apparatus.

13. An apparatus according to claim 4, cooling water for a cooling air outlet from said second heat exchanger stage passes to a further heat exchanger system.

14. A method according to claim 3, wherein a majority of the condensable harmful substances and solid particles are separated from the process gas or waste air by said pre-filtering steps.

15. A method according to claim 14, wherein said first cooling medium is discharged for use in a heat-exchanger of a plant emitting through a process gas, condensable harmful substances and solid particles which are separated by said method.

16. A method according to claim 15, wherein said second and said first condensates containing impurities are collected in a common condensate collector.

17. A method according to claim 16, further comprising the steps of blowing said warm waste air into said mechanical filtering stage by a first blower and into an exhaust flue by a second blower after it has passed the mechanical filtering stage, and said harmful substances are extracted from said mechanical filtering stage and said blower into said common condensate collector.

18. A method according to claim 17, wherein said first cooling medium is discharged for heating the process gas of a drier in a textile finishing plant.

* * * * *